(12) United States Patent
Jelacic

(10) Patent No.: US 12,345,048 B2
(45) Date of Patent: Jul. 1, 2025

(54) GUTTER INSTALLATION AND GUTTER MESH FASTENER

(71) Applicant: Top Intellectual Property Pty Ltd, Kings Park (AU)

(72) Inventor: Richard Jelacic, Kings Park (AU)

(73) Assignee: Top Intellectual Property Pty Ltd, Kings Park (AU)

( * ) Notice: Subject to any disclaimer, the term of this patent is extended or adjusted under 35 U.S.C. 154(b) by 92 days.

(21) Appl. No.: 18/008,991

(22) PCT Filed: Jun. 10, 2021

(86) PCT No.: PCT/AU2021/050589
§ 371 (c)(1),
(2) Date: Dec. 8, 2022

(87) PCT Pub. No.: WO2021/248195
PCT Pub. Date: Dec. 16, 2021

(65) Prior Publication Data
US 2023/0287683 A1    Sep. 14, 2023

(30) Foreign Application Priority Data

Jun. 10, 2020  (AU) ................................ 2020901911
Jun. 30, 2020  (AU) ................................ 2020101209

(51) Int. Cl.
*E04D 13/00*   (2006.01)
*E04D 13/064*  (2006.01)
*E04D 13/076*  (2006.01)

(52) U.S. Cl.
CPC ......... *E04D 13/076* (2013.01); *E04D 13/064* (2013.01)

(58) Field of Classification Search
CPC . E04D 13/064; E04D 13/068; E04D 13/0685; E04D 13/0727; E04D 13/076; E04D 13/04
See application file for complete search history.

(56) References Cited

U.S. PATENT DOCUMENTS 3,297,285 A      1/1967  Simmons
4,937,986 A  *   7/1990  Way, Sr. ............... E04D 13/076
                                                    52/12
(Continued)

FOREIGN PATENT DOCUMENTS

AU          716209 B3    2/2000
AU       2019201699 A1   9/2019
(Continued)

OTHER PUBLICATIONS

International Search Report which issued on PCT/AU2021/050589 dated Jul. 1, 2021.

(Continued)

*Primary Examiner* — Chi Q Nguyen
(74) *Attorney, Agent, or Firm* — Bauer and Joseph; Thomas Joseph

(57) ABSTRACT

There is disclosed a gutter installation (50) secured at an edge (52) of a roof (54) of a building (56). The gutter installation includes a gutter (58) having a gutter channel (60) to receive water flowing from the roof (54). The gutter installation (50) further includes gutter mesh (62) to cover at least a portion of the gutter channel (60) and a gutter mesh fastener (64) operatively adapted to secure the gutter mesh (62) to the edge of the roof (54). The gutter mesh fastener (64) includes (i) a fastener body (66) operatively adapted to be secured to the roof (54) and (ii) a plurality of fastener teeth (68) outwardly extending from the fastener body (66). The fastener teeth (68) are operatively adapted to pass (Continued)

through mesh openings (70) of the gutter mesh (64) to secure the gutter mesh (62) to the roof (54).

19 Claims, 20 Drawing Sheets

(56) References Cited

U.S. PATENT DOCUMENTS

| | | | | |
|---|---|---|---|---|
| 5,398,464 | A * | 3/1995 | Jacobs | E04D 13/076 52/12 |
| 5,729,931 | A | 3/1998 | Wade | |
| 7,624,541 | B2 * | 12/2009 | Gentry | E04D 13/076 52/12 |
| 8,302,369 | B2 | 11/2012 | Jelacic | |
| 8,528,262 | B2 * | 9/2013 | Horton | E04D 13/0725 52/12 |
| 9,127,463 | B1 * | 9/2015 | Feldhaus | E04D 13/076 |
| 9,938,722 | B1 * | 4/2018 | Voress | E04D 13/076 |
| 10,458,121 | B2 * | 10/2019 | Lenney | E04D 13/0767 |
| 10,801,208 | B1 * | 10/2020 | Bryer | E04D 13/076 |
| 11,661,747 | B2 * | 5/2023 | Brochu | E04D 13/0685 52/12 |
| 11,739,530 | B2 * | 8/2023 | Lenney | E04D 13/076 52/12 |
| 11,788,296 | B2 * | 10/2023 | Lenney | E04D 13/076 52/12 |
| 11,965,338 | B2 * | 4/2024 | Lenney | E04D 13/076 |
| 12,018,490 | B2 * | 6/2024 | Lenney | E04D 13/068 |

FOREIGN PATENT DOCUMENTS

| | | |
|---|---|---|
| BE | 10009295 A6 | 1/1997 |
| DE | 26909135 U1 | 8/1996 |
| EP | 1359264 A2 | 11/2003 |
| EP | 1557505 A1 | 7/2005 |

OTHER PUBLICATIONS

First examination report which issued on corresponding Australian innovation patent No. 2020101209 dated Sep. 11, 2020.
Second examination report which issued on corresponding Australian innovation patent No. 2020101209 dated Feb. 22, 2021.
European Search Report for European Patent Application No. EP21820998.9. Mailed Sep. 12, 2024.

* cited by examiner

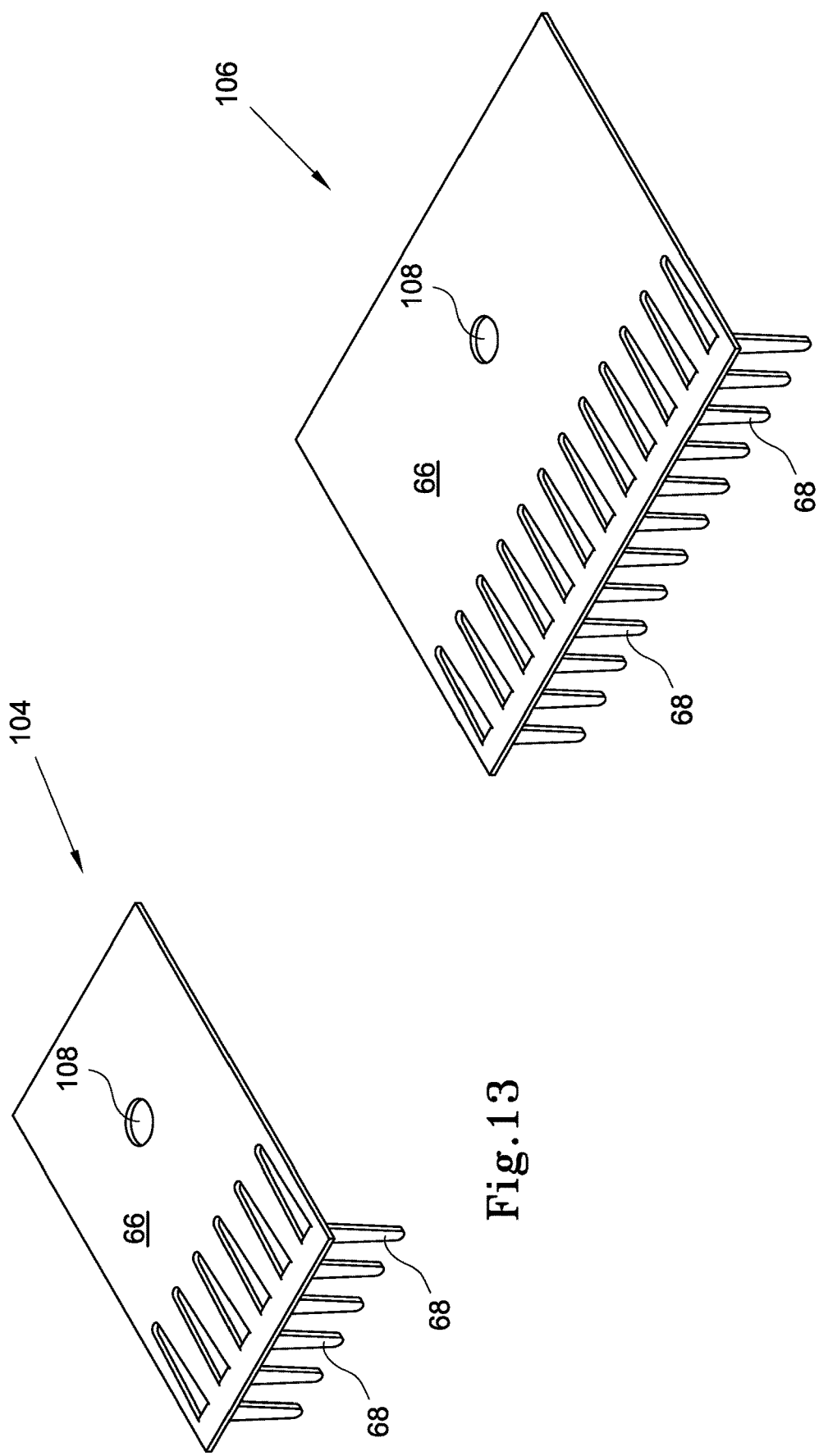

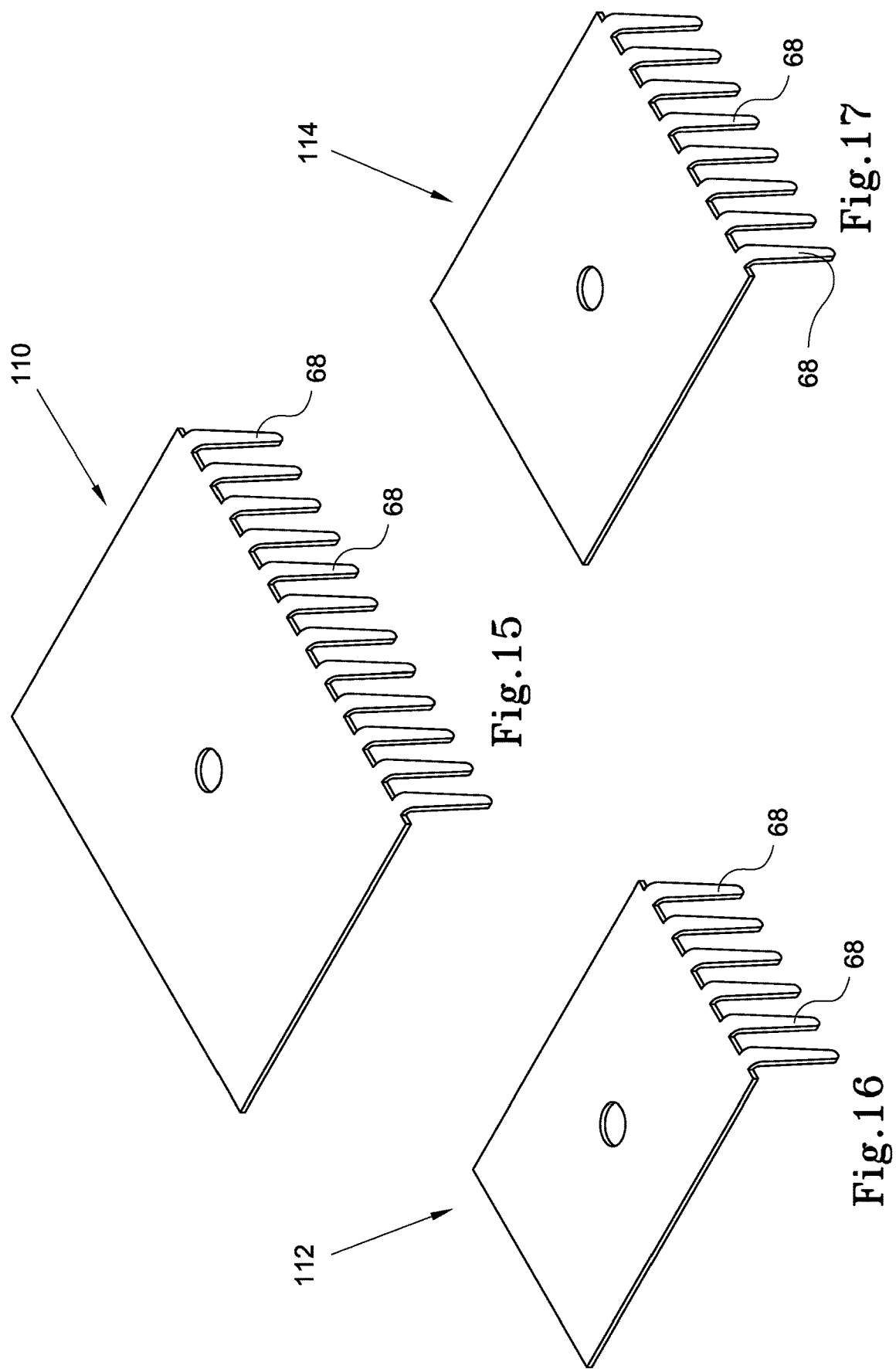

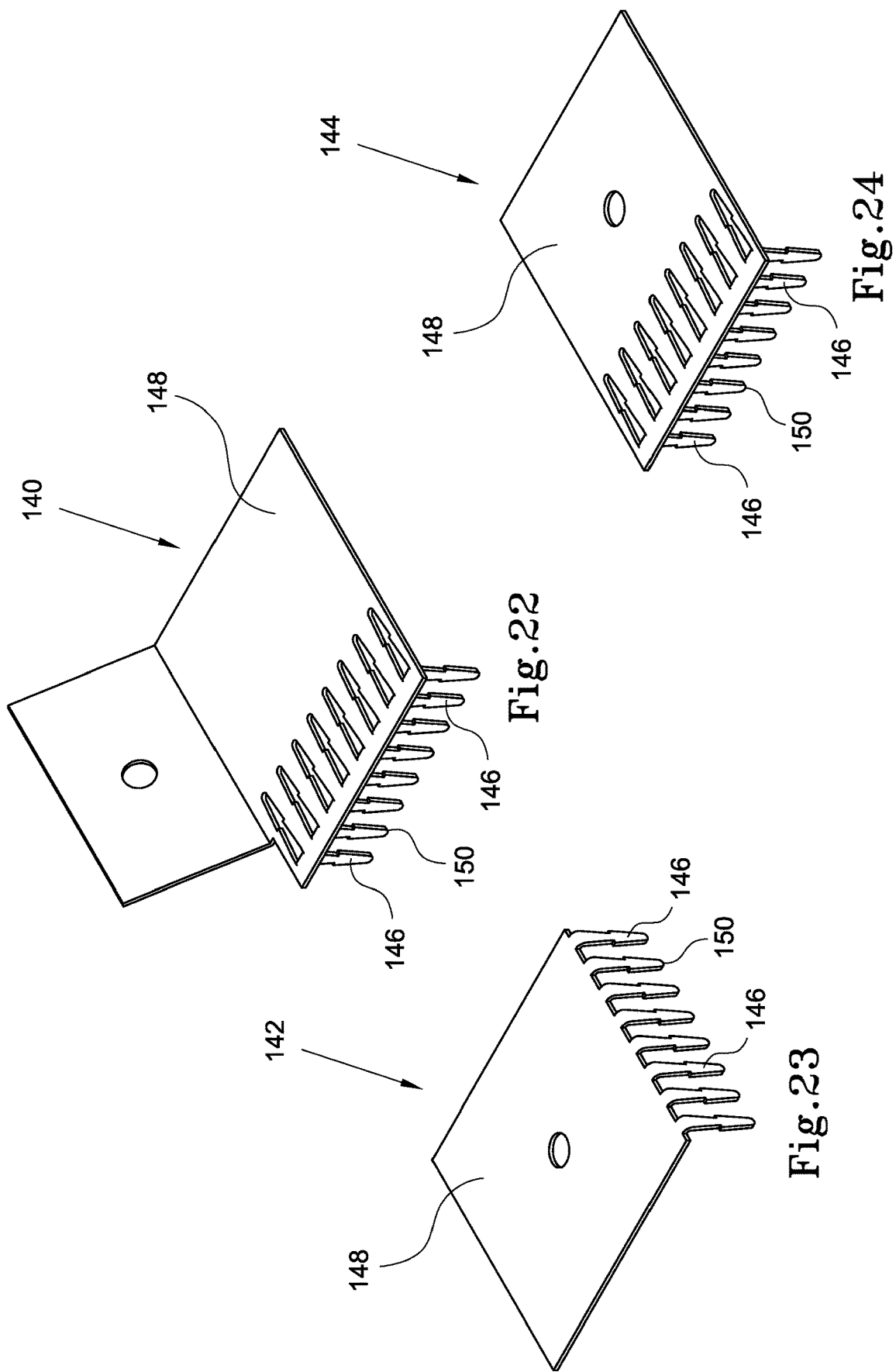

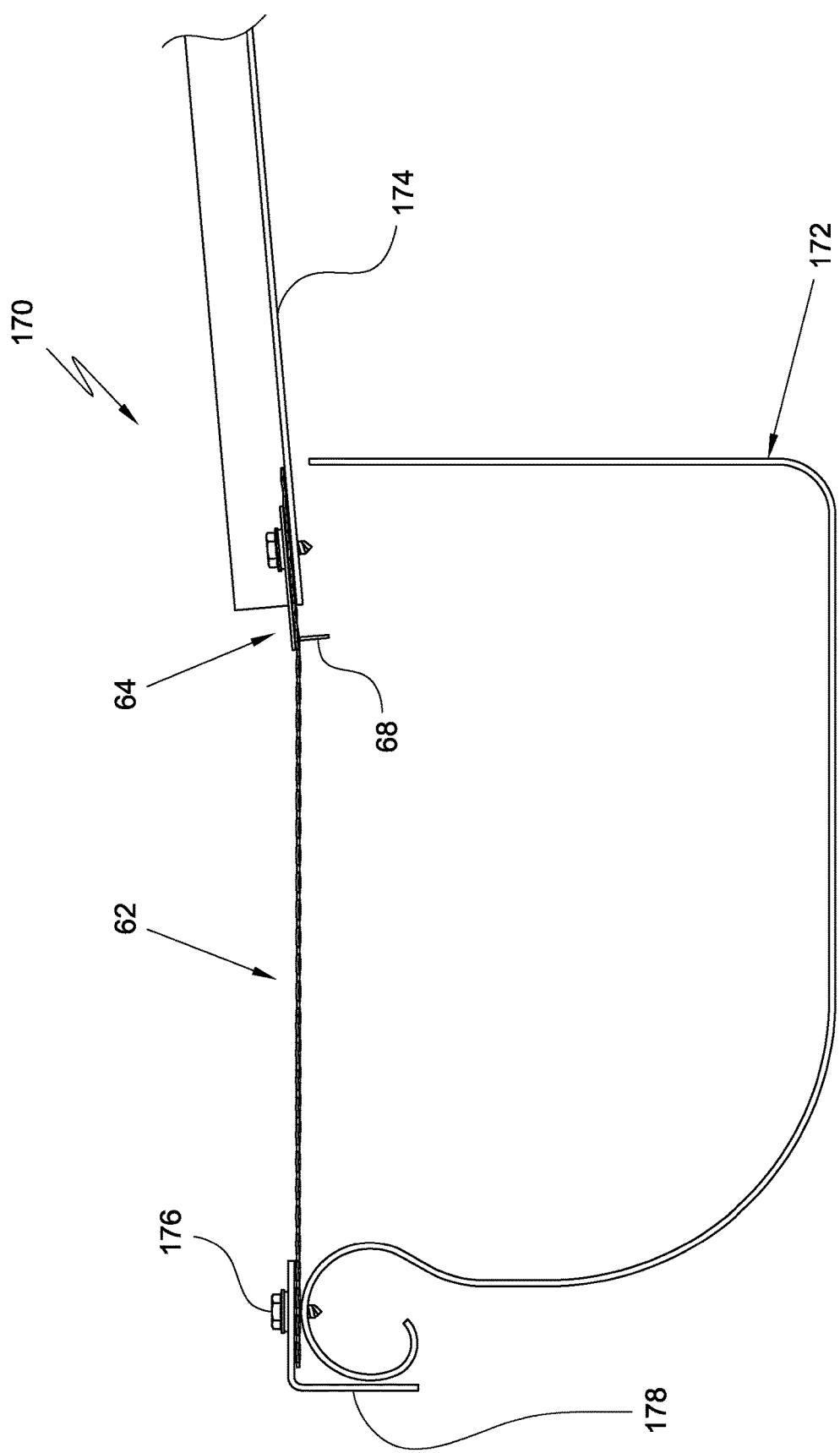

GUTTER INSTALLATION AND GUTTER MESH FASTENER

CROSS REFERENCE TO RELATED APPLICATIONS

The present application is a U.S. national stage application of PCT International Application No. PCT/AU2021/050589, filed Jun. 10, 2021, and published as PCT Publication WO/2021/248195 on Dec. 16, 2021, which claims priority to Australian Application Nos. AU 2020101209, filed on Jun. 30, 2020, and AU 2020901911, filed on Jun. 10, 2020. The disclosures of all the foregoing applications are hereby incorporated by reference in their entirety into the present application.

FIELD

The invention concerns a gutter installation. In one particular but non-exclusive aspect the invention concerns a gutter installation wherein a box gutter is covered with gutter mesh. In a further aspect the invention concerns a gutter mesh fastener for securing gutter mesh in position across a box gutter.

BACKGROUND

A rain gutter is a water collection channel which forms part of the water discharge system of a building. There are various reasons to prevent the uncontrolled flow of water from the roof of a building. Those reasons include preventing moisture damage to the walls of a building, directing water to a desirable site where it can be disposed of without causing damage to the foundations of the building and to deter persons entering or exiting a building being drenched by water flowing down the roof.

It is well known that leaves and other debris tend to accumulate inside a gutter. Such accumulation is undesirable as it will impede the flow of water inside the gutter and could lead to water pushing into the roof of the building causing damage to the interior of the building. Another problem with the accumulation of leaves and other flammable debris inside a gutter is that such matter could pose a fire hazard which may be set alight by burning embers emanating from a bushfire.

To prevent water damage resulting from clogged gutters it is necessary to clean gutters on a regular basis. As an alternative to regular cleaning, it is possible to deter the accumulation of leaves and other debris within a gutter. This can be achieved by installing a gutter guard across the openside of a gutter. One example of a typical gutter guard includes a permeable mesh which prevents leaves and other debris from entering the gutter while simultaneously allowing water flowing from the roof to pass into the gutter to be fed away to a desirable discharge site.

Industrial buildings often employ so-called box gutters. One reason a box gutter is referred to as such is because of its "boxy" shape. The main reason for the name, however, is that box gutters are "boxed in" or enclosed so that they are normally not visible when the outside of a building is viewed from ground level. Due to the nature of the installation of a box gutter it is problematic to fit a mesh gutter in position with the result that box gutters of industrial buildings typically do not have gutter guards and as a result require regular cleaning with the associated cost.
Object One object of the present invention is to provide an alternative gutter installation wherein a box gutter is covered with a gutter mesh and to provide an alternative gutter mesh fastener to facilitate fastening of gutter mesh across a box gutter. Another object is to provide an alternative gutter installation wherein gutter mesh covers an external or eaves gutter.

SUMMARY

According to a first aspect of the present invention there is disclosed herein a gutter installation secured at an edge of a roof of a building including:
  a gutter having a gutter channel to receive water flowing from the roof;
  gutter mesh to cover at least a portion of the gutter channel; and
  a gutter mesh fastener operatively adapted to secure the gutter mesh to the edge of the roof, the gutter mesh fastener including (i) a fastener body mounted to a top surface of the roof and secured at the edge of the roof, and (ii) a plurality of fastener teeth outwardly extending from the fastener body, the fastener teeth operatively adapted to pass through mesh openings of the gutter mesh to secure the gutter mesh to the roof.

Preferably the fastener body incudes a planar surface operatively adapted to abut an upper surface of the roof.

Preferably the fastener teeth are laterally spaced apart along the fastener body.

Preferably each fastener tooth extends longitudinally outwardly from the fastener body to a distal tooth end.

Preferably each fastener tooth tapers inwardly from the fastener body to its respective distal tooth end.

In a preferred embodiment the gutter mesh fastener includes a ridge fastener body secured to the fastener body and angled relative fastener body.

Preferably the gutter mesh fastener is secured to the roof with a mechanical fastener.

Preferably each fastener tooth has an arrowhead shape at their respective distal tooth ends.

Preferably the gutter incudes first and second opposing, laterally spaced apart co-extensive gutter walls which define the gutter channel, the first wall being located proximate the edge of the roof and the second wall being laterally spaced apart from the edge of the roof.

Preferably the second wall of the gutter is secured to a wall of the building.

Preferably the wall is a parapet wall.

Preferably the gutter installation includes a support formation operatively adapted to secure a portion of the gutter mesh proximate the second wall of the gutter.

Preferably the support formation includes an elongate support member secured to the wall.

Preferably the support formation includes an elongate support mesh fastener operatively adapted to secure the gutter mesh to the support member.

Preferably the support mesh fastener includes (i) a support spine adapted to be secured to the support member, and (ii) a plurality of support teeth outwardly extending from the support spine, the support teeth operatively adapted to pass through mesh openings of the gutter mesh to secure the gutter mesh to the support member.

Preferably the support spine is secured to the support member.

Preferably the support spine is secured to the support member with a mechanical fastener.

In a further aspect there is disclosed a gutter mesh fastener operatively adapted to secure gutter mesh to an edge of a roof, the gutter mesh fastener including (i) a fastener body operatively adapted to be mounted to a top surface of the roof and secured at the edge of the roof, and (ii) a plurality of fastener teeth outwardly extending from the fastener body, the fastener teeth operatively adapted to pass through mesh openings of the gutter mesh to secure the gutter mesh to the roof.

Preferably the fastener body incudes a planar surface operatively adapted to abut a surface of the roof.

Preferably the fastener teeth are laterally spaced apart along the fastener body.

Preferably each fastener tooth extends longitudinally outwardly from the fastener body to a distal tooth end.

Preferably each fastener tooth tapers inwardly from the fastener body to its respective distal tooth end.

Preferably the gutter mesh fastener includes a ridge fastener body secured to the fastener body and angled relative to fastener body.

Preferably each fastener tooth has an arrowhead shape at their respective distal tooth ends.

According to a further aspect there is disclosed a support mesh fastener including (i) a support spine operatively associated with gutter mesh to be secured in position, and (ii) a plurality of support teeth outwardly extending from the support spine, the support teeth operatively adapted to grip the gutter mesh to secure the gutter mesh in position, wherein the support teeth are arranged in two opposing rows located on opposite sides of the support spine.

According to yet further aspect there is disclosed a support mesh fastener including (i) a support spine operatively associated with gutter mesh to be secured in position, and (ii) a plurality of support teeth outwardly extending from the support spine, the support teeth operatively adapted to grip the gutter mesh to secure the gutter mesh in position.

BRIEF DESCRIPTION OF THE DRAWINGS

Preferred embodiments of the invention will be described hereinafter, by way of examples only, with reference to the accompany drawings, wherein:

FIG. 13 is a perspective view of a second embodiment gutter mesh fastener;

FIG. 14 is a perspective view of a third embodiment gutter mesh fastener;

FIG. 15 is a perspective view of a fourth embodiment gutter mesh fastener;

FIG. 16 is a perspective view of a fifth embodiment gutter mesh fastener;

FIG. 17 is a perspective view of a sixth embodiment gutter mesh fastener;

FIG. 22 is a perspective view of a tenth embodiment gutter mesh fastener;

FIG. 23 is a perspective view of an eleventh embodiment gutter mesh fastener;

FIG. 24 is a perspective view of a twelfth embodiment gutter mesh fastener;

FIG. 26 is a side view of a fourth embodiment gutter installation.

DESCRIPTION OF PREFERRED EMBODIMENTS

Figure 1:
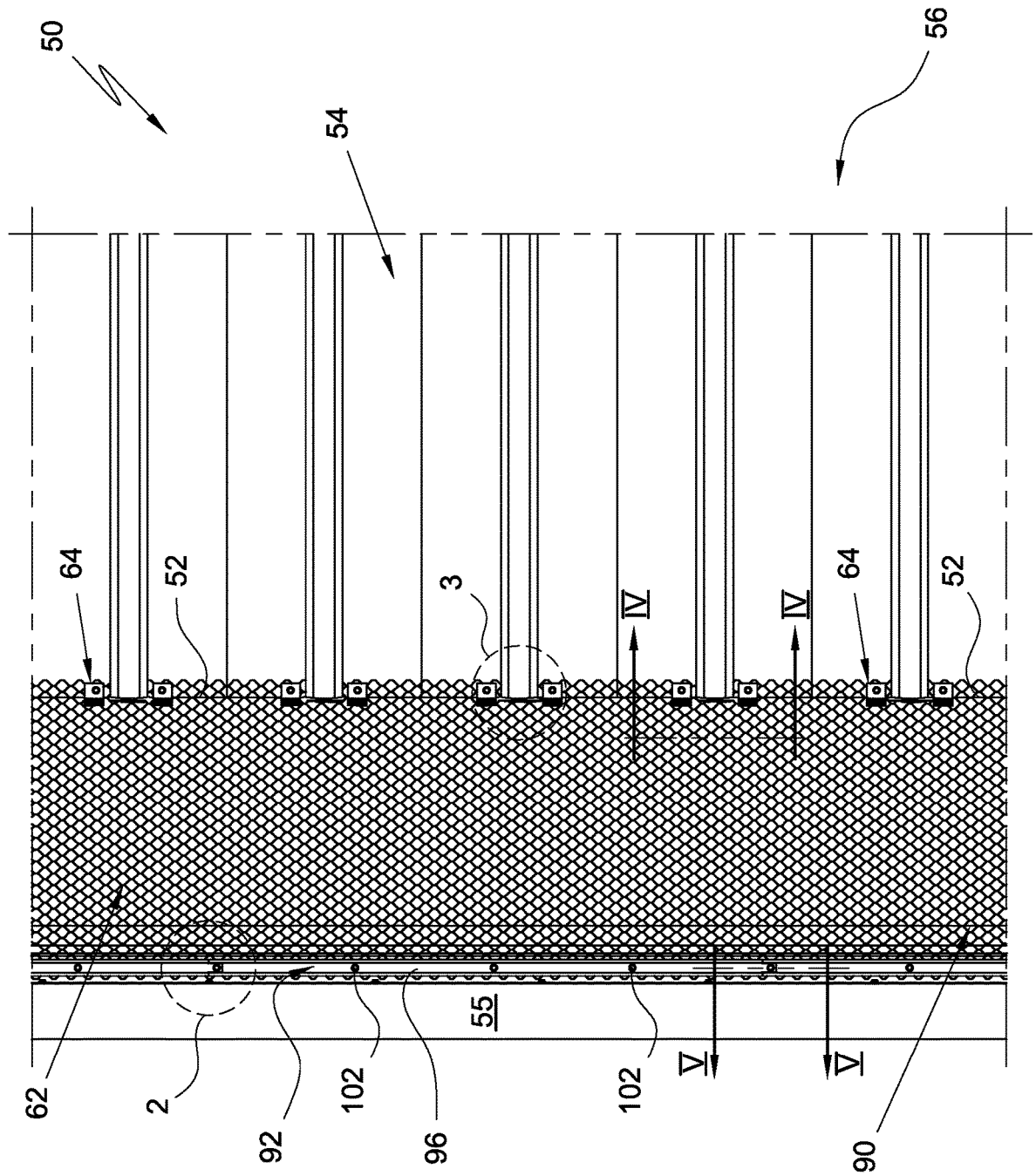
FIG. 1 is a top view of a portion of an embodiment gutter installation.
Figure 2:
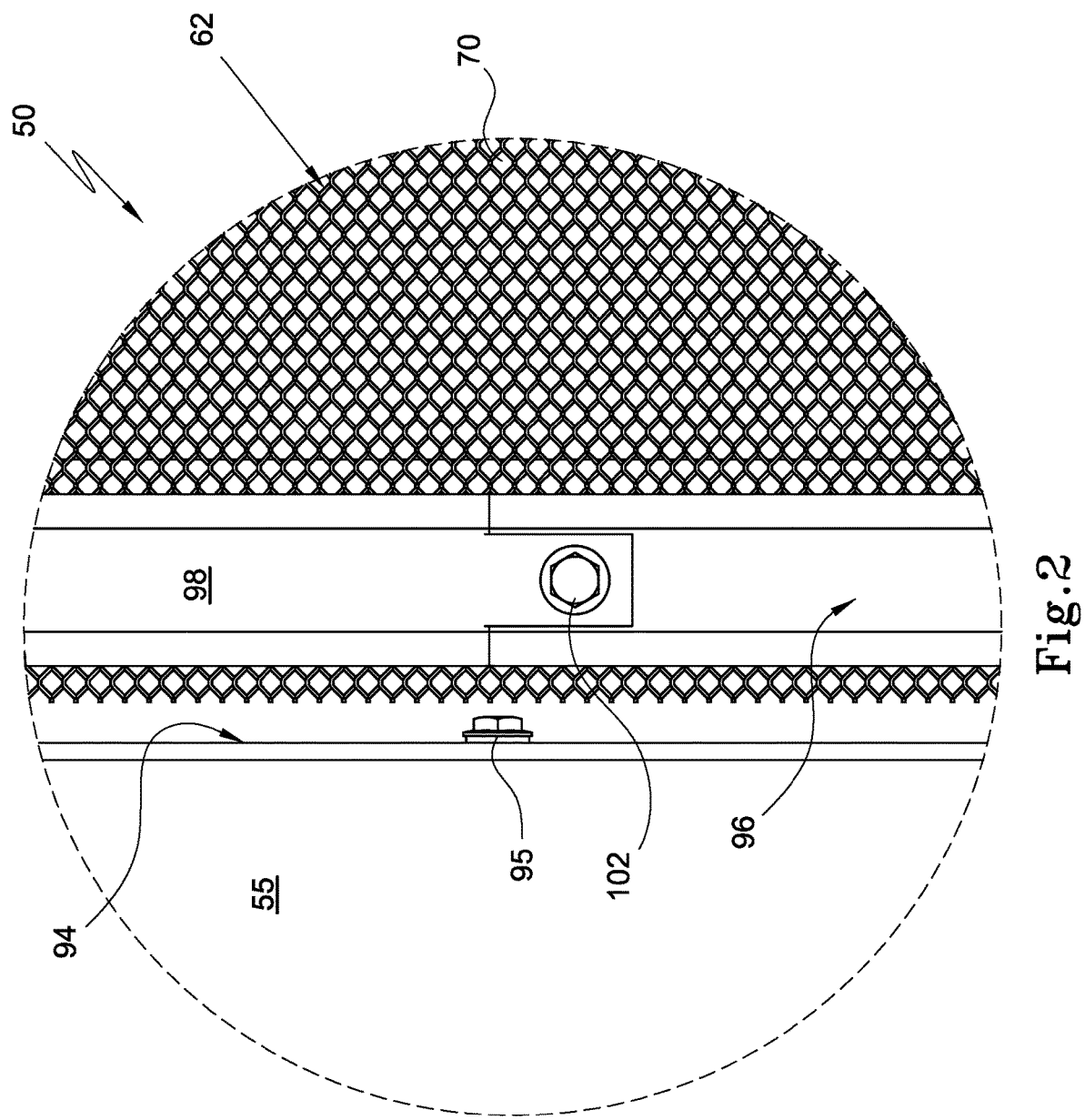
FIG. 2 is an enlarged view of portion 2 marked in FIG. 1.
Figure 3:
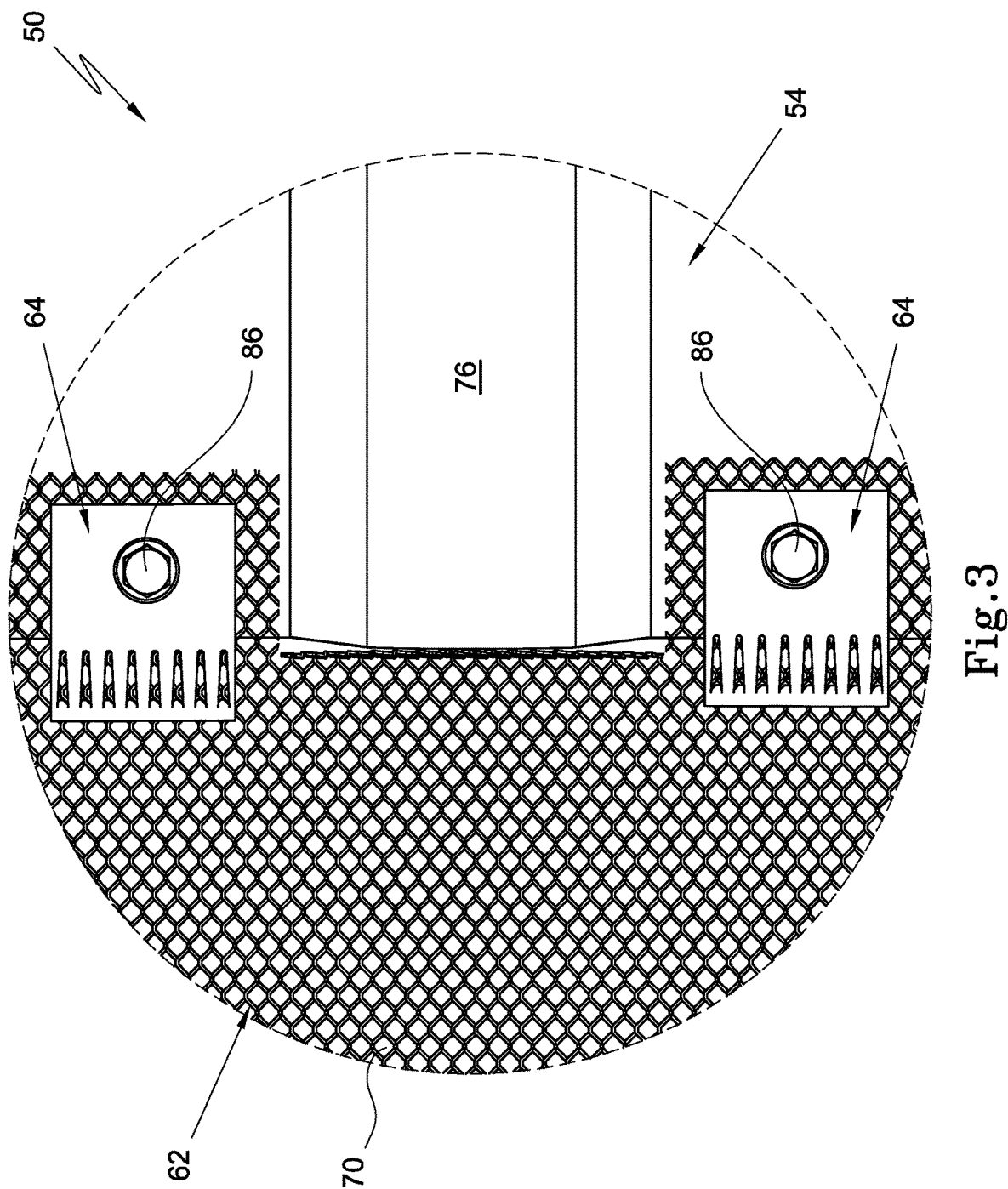
FIG. 3 is an enlarged view of portion 3 marked in FIG. 1 showing a first embodiment gutter mesh fastener.

FIGS. 1 to 12 show an embodiment gutter installation, generally indicated with the reference numeral 50, secured at an edge 52 of a roof 54 of a building 56. The gutter installation 50 includes a gutter 58, shown in FIG. 6. In this embodiment the gutter 58 is of the type referred to as a box gutter as it is enclosed behind a wall 55 to be hidden from view. The gutter 58 defines a gutter channel 60 to receive water flowing from the roof 54 and to feed such water away from the building 56. It will of course be appreciated that the below described installation is not limited to box gutter installations and could be employed for various different gutters such as external or eaves gutters.

The gutter installation 50 includes a strip of gutter mesh 62 which covers the gutter channel 60. The gutter mesh 62 serves to prevent leaves and other debris from entering the gutter 58 while simultaneously allowing water flowing from the roof 54 to pass into the gutter 58 to be fed away from the building to a desirable discharge site.

Figure 4:
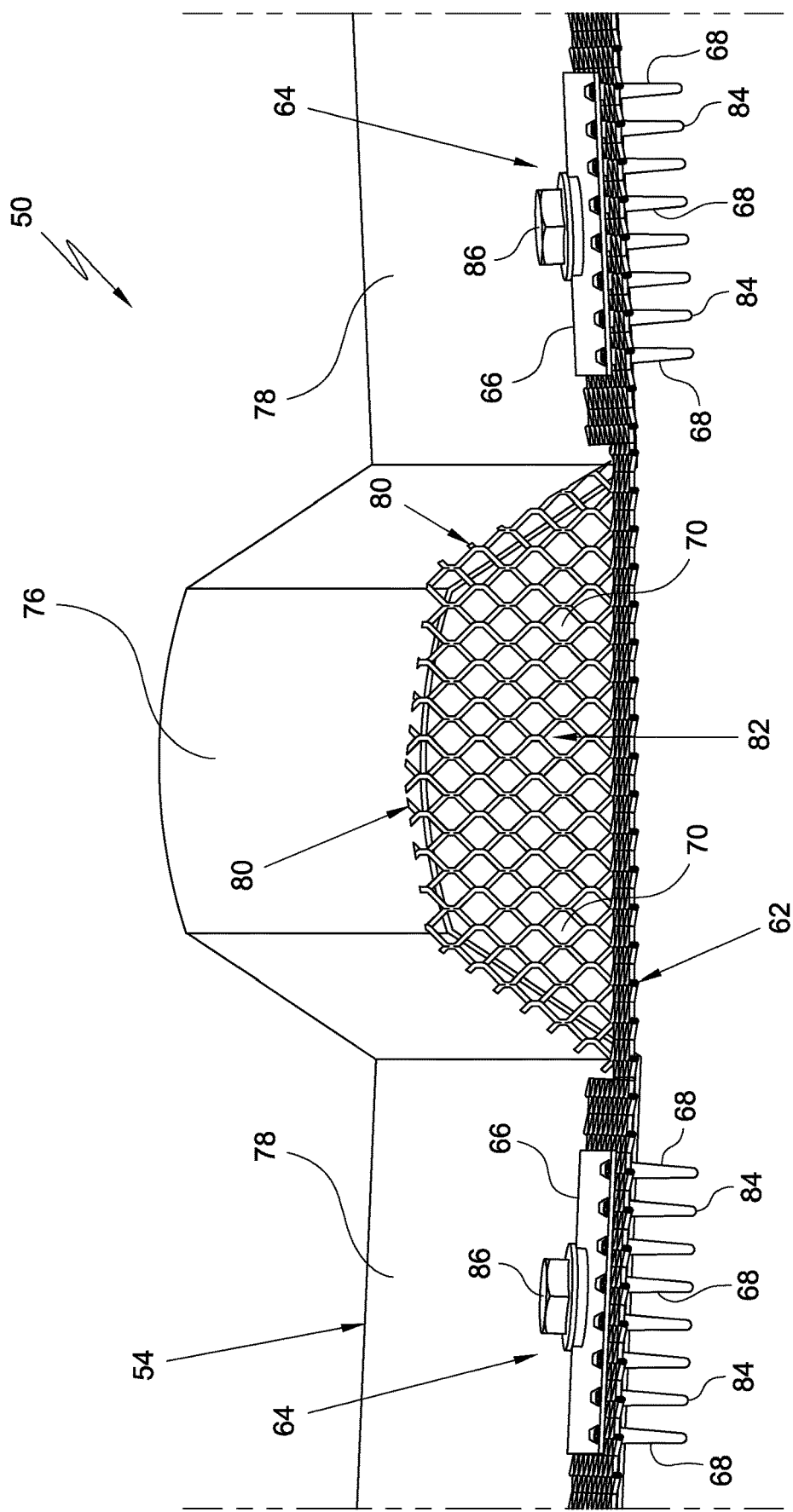
FIG. 4 is a cross-sectional view at the line Iv-Iv in FIG. 1.
Figure 5:
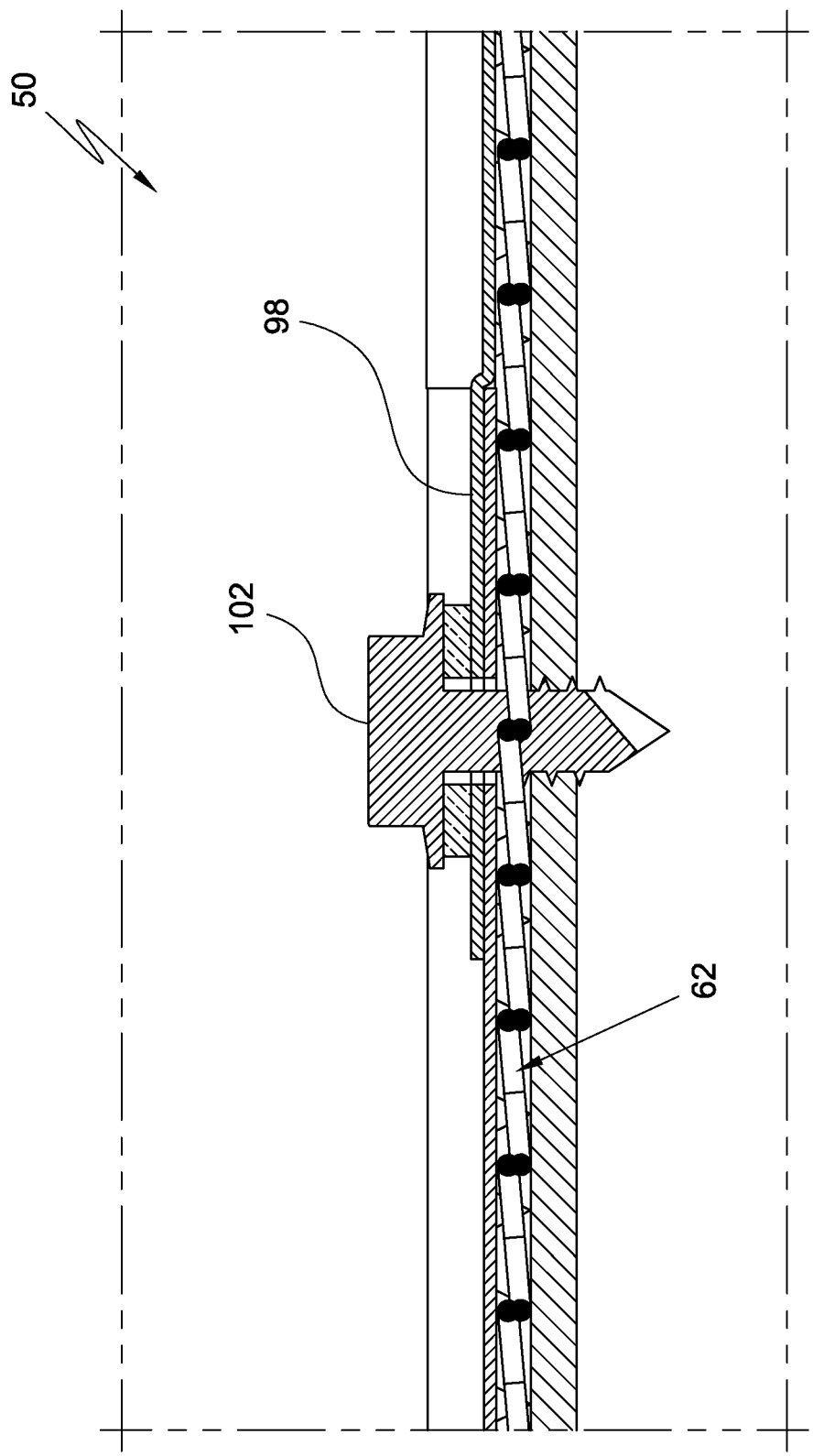
FIG. 5 is a cross-sectional view at the line V-V in FIG. 1.
Figure 6:
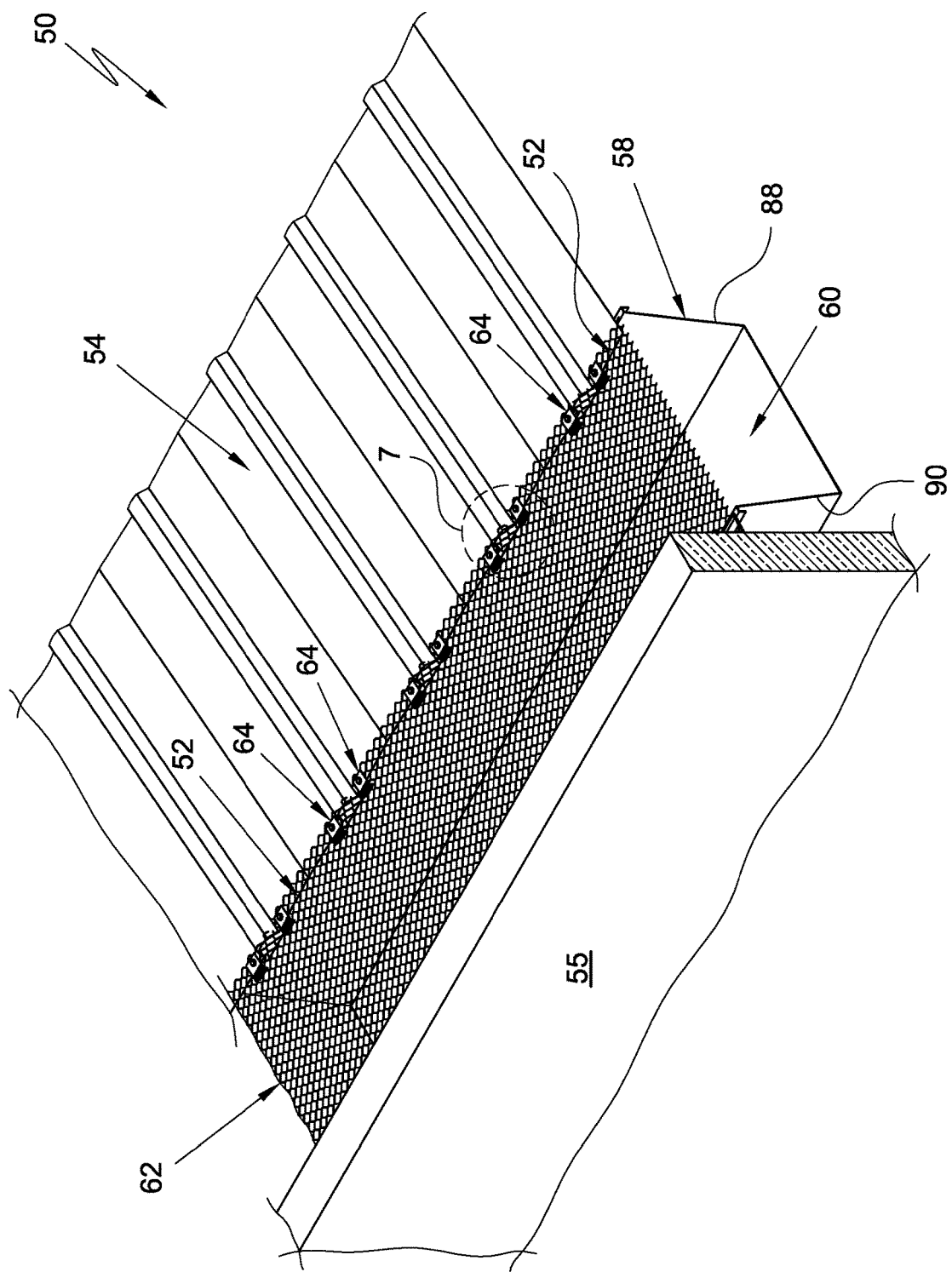
FIG. 6 is a perspective view of the gutter installation of FIG. 1.
Figure 7:
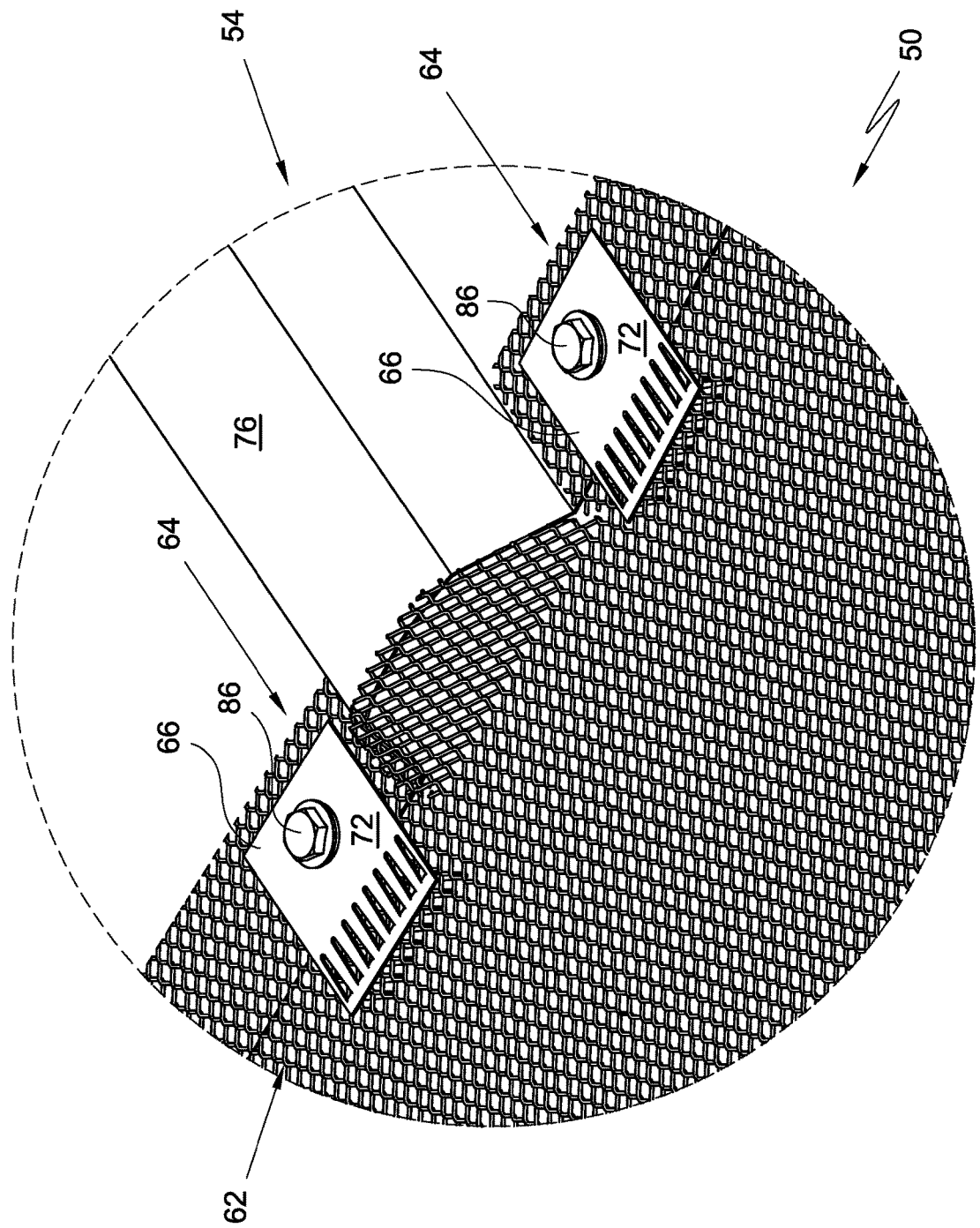
FIG. 7 is an enlarged view of portion 7 marked in FIG. 6.
Figure 8:
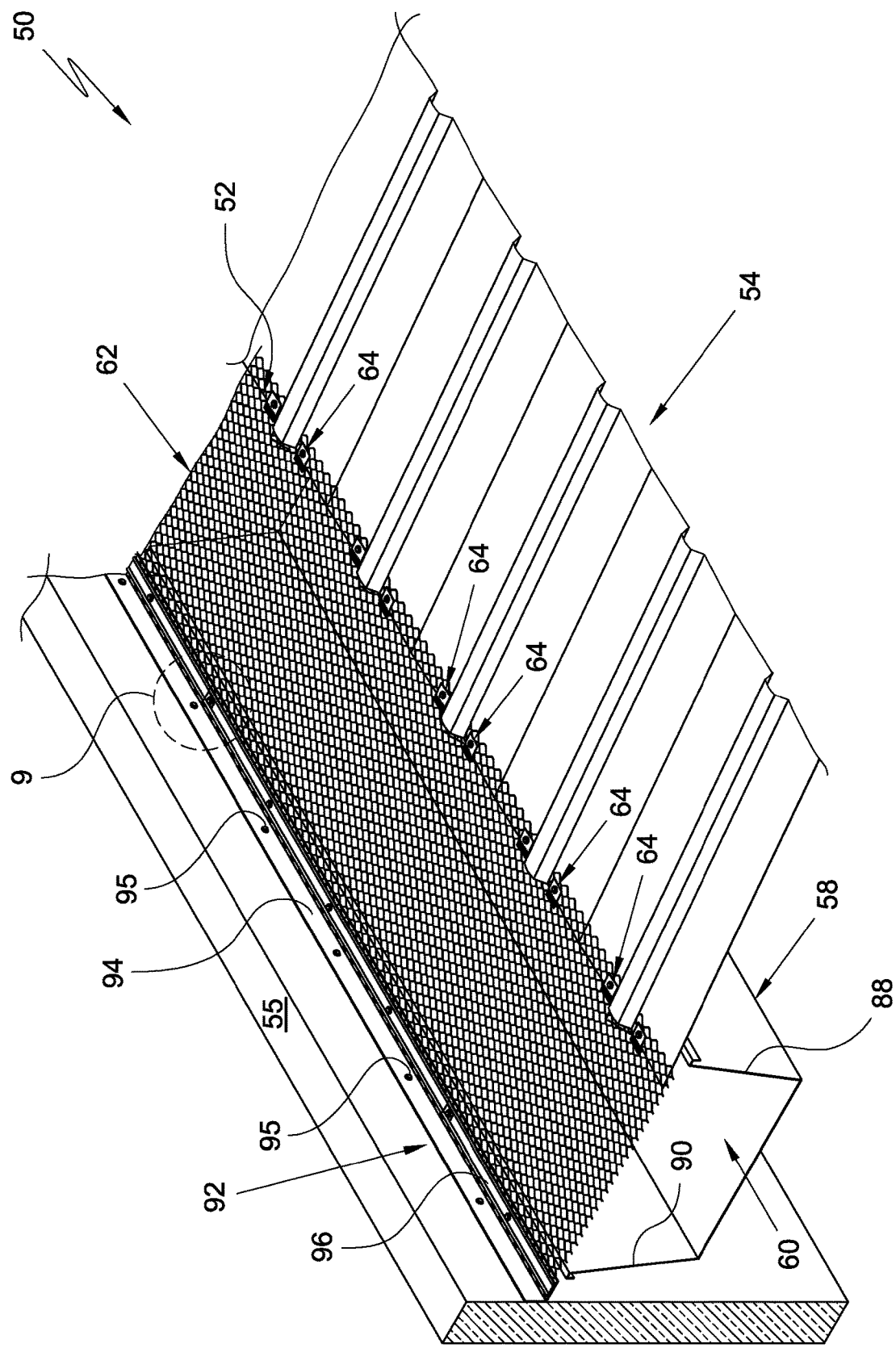
FIG. 8 is a further perspective view of the gutter installation of FIG. 1.
Figure 9:
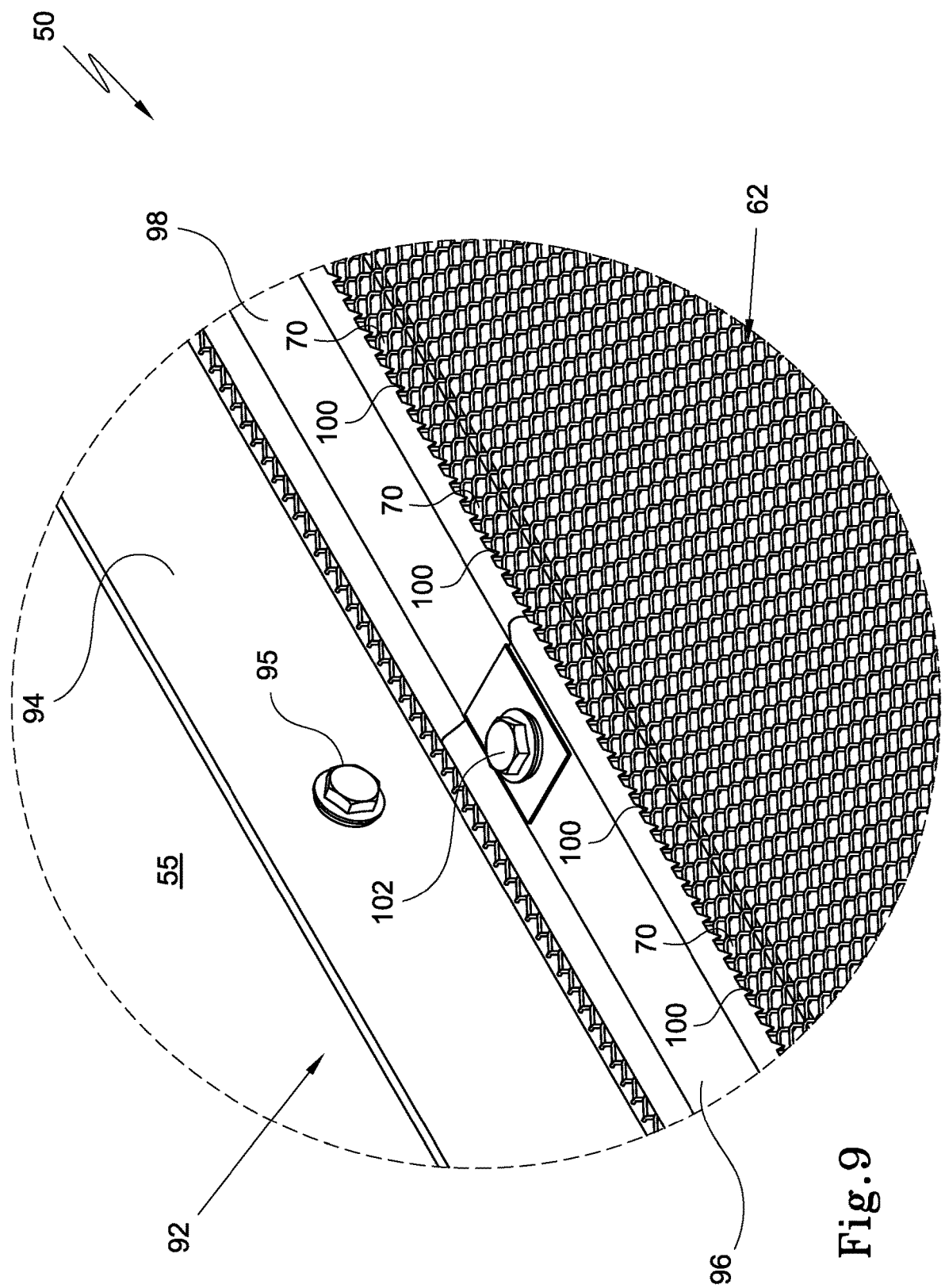
FIG. 9 is an enlarged view of portion 9 marked in FIG. 8 showing a first embodiment support mesh fastener.
Figure 10:
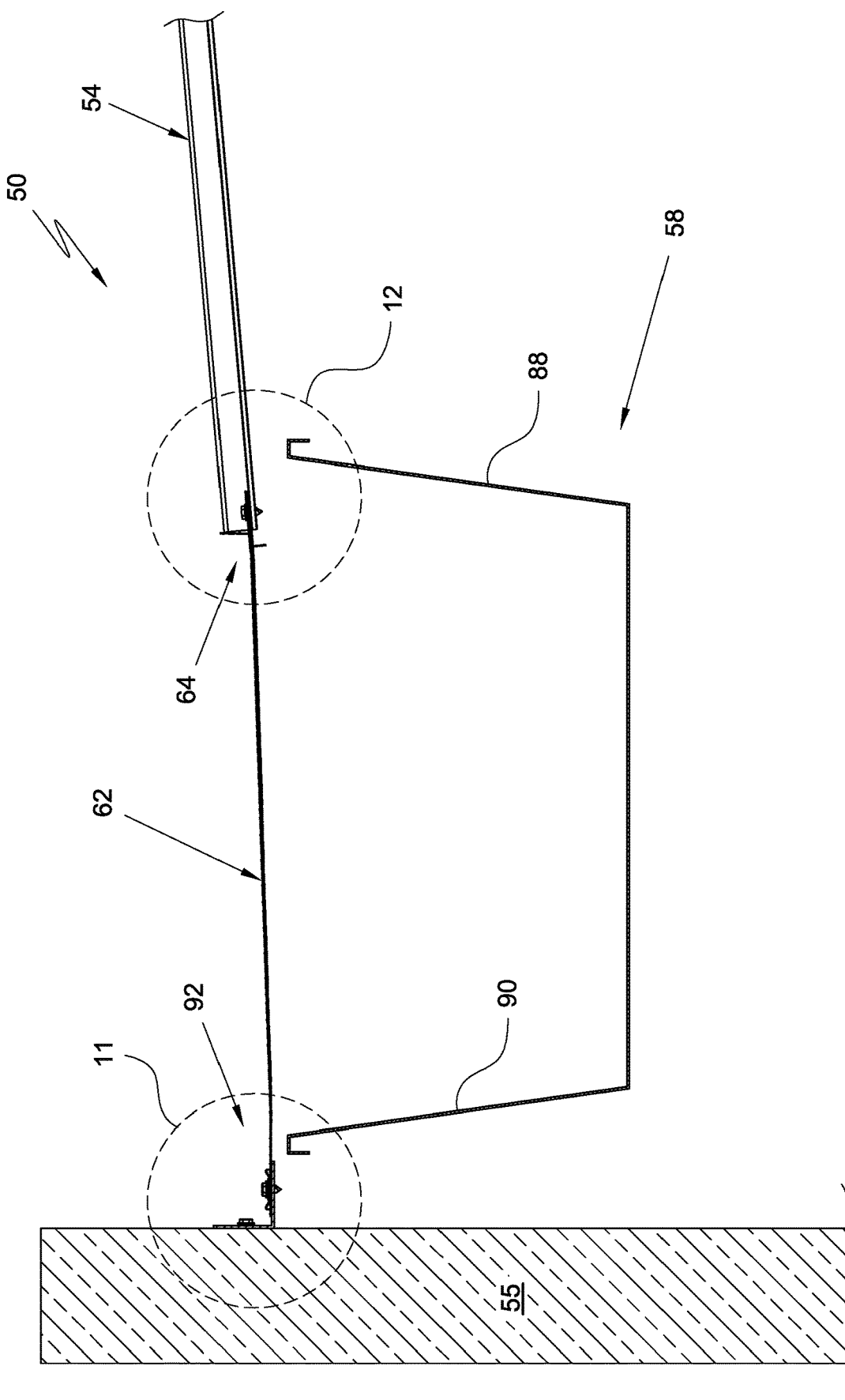
FIG. 10 is a side view of the gutter installation of FIG. 1.
Figure 11:
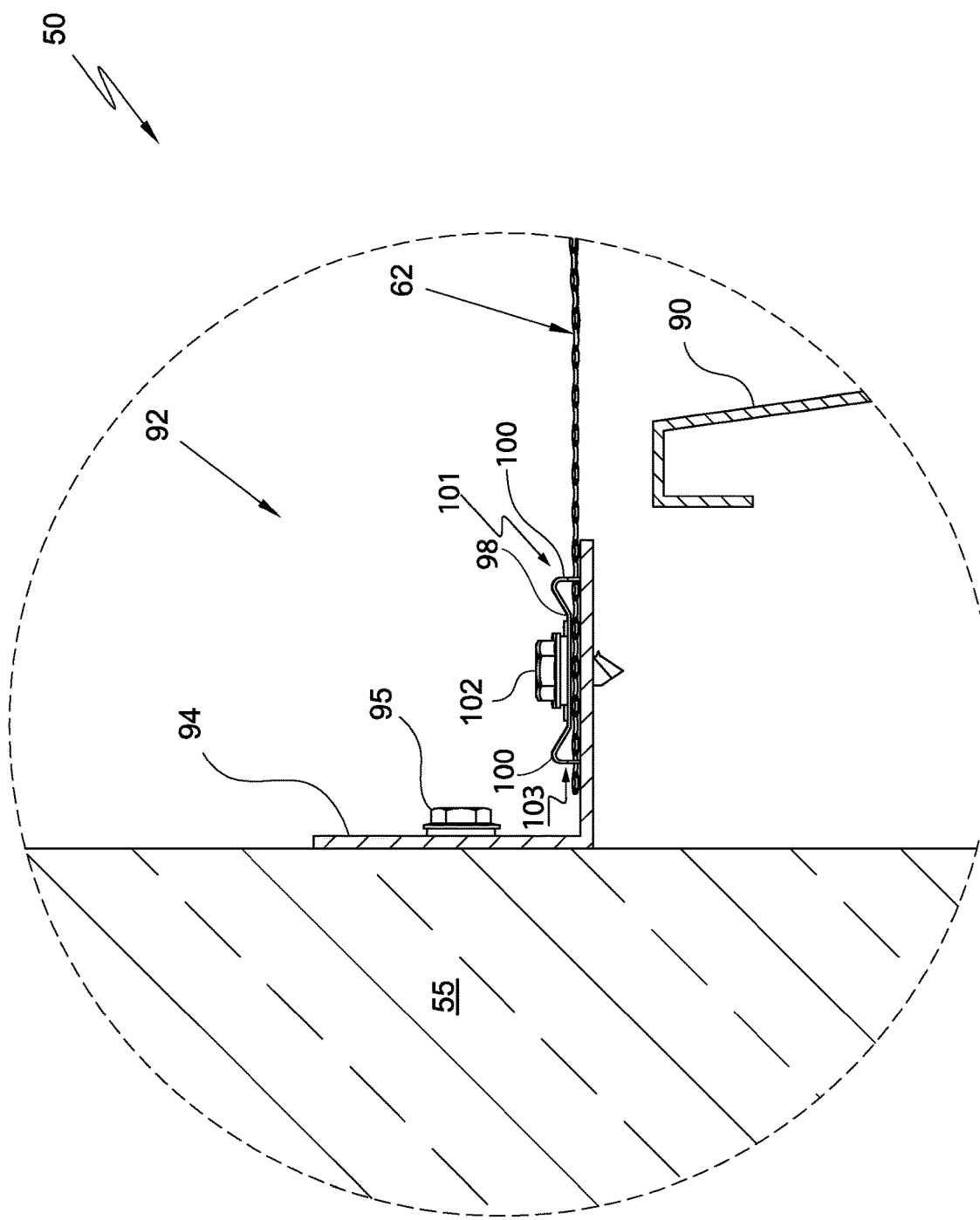
FIG. 11 is an enlarged view of portion 11 marked in FIG. 10.
Figure 12:
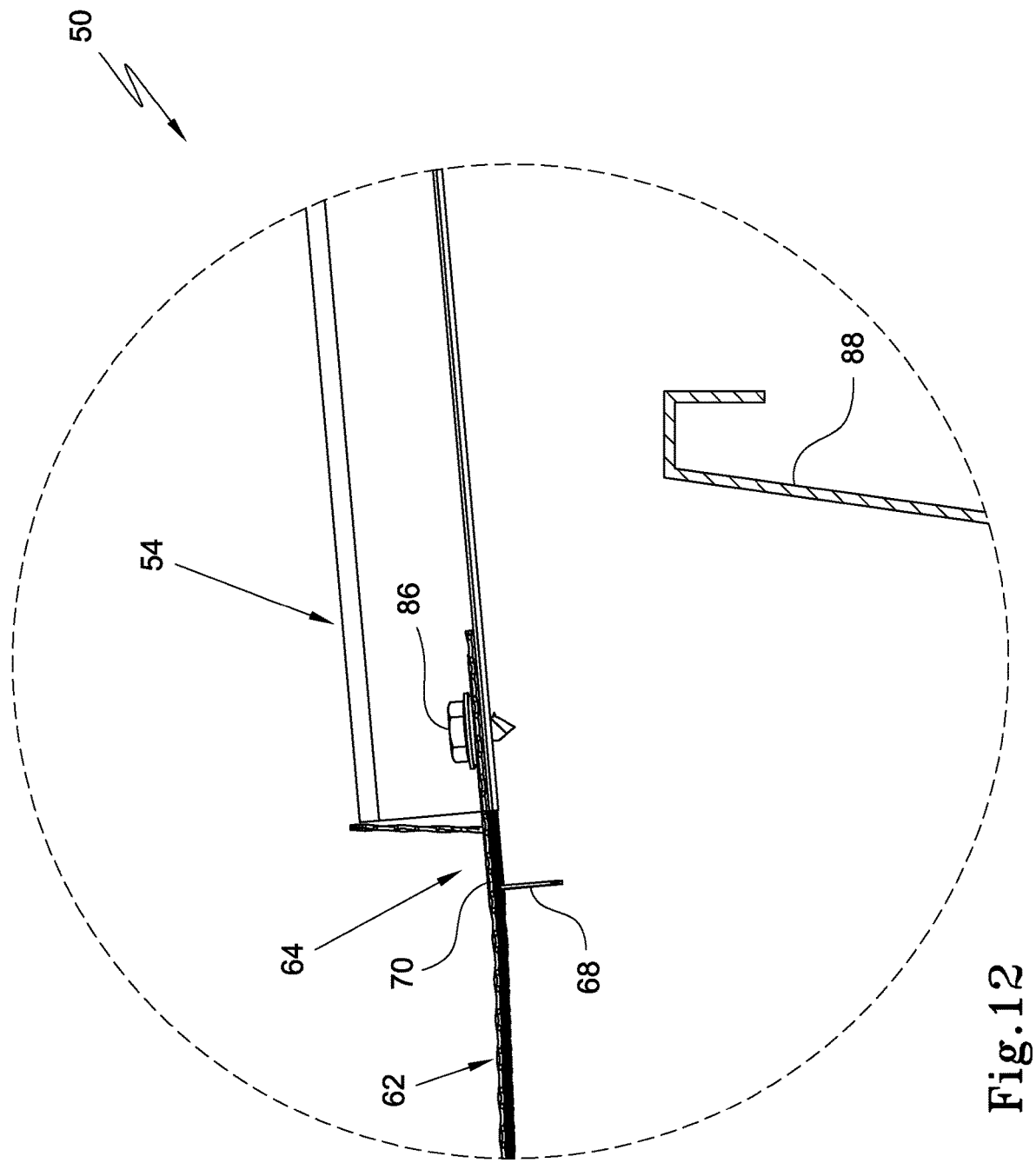
FIG. 12 is an enlarged view of portion 12 marked in FIG. 10.

The gutter installation 50 includes a plurality of embodiment gutter mesh fasteners 64 operatively adapted to secure the gutter mesh 62 to the edge 52 of the roof 54. Referring to FIGS. 4 and 12, each gutter mesh fastener 64 includes a fastener body 66, operatively adapted to be mounted to a top surface of the roof and secured at the edge of the roof 54, and a plurality of fastener teeth 68 which outwardly extend from the fastener body 66. The fastener teeth 68 are operatively adapted to grip or pass through mesh openings 70 of the gutter mesh 62 to secure the gutter mesh 62 to the roof 54. As shown in FIG. 7 the fastener body 66 incudes a planar surface 72 operatively adapted to abut a flat upper surface 74 of the roof 54. It is pointed out that the roof 54 is provided in the form of roofing/walling metal having a plurality of ridges 76 spaced apart by flat sections 78. The gutter mesh fasteners 64 are secured in position to the flat sections 78. An upwardly bent portion 80 of gutter mesh 62 covers an opening 82 at the end of the ridge 76 in FIG. 4.

FIG. 4 shows that fastener teeth 68 of each gutter mesh fastener 64 are laterally spaced apart along the length of its respective fastener body 66. Each fastener tooth 68 further extends longitudinally outwardly from the fastener body 66 to a distal tooth end 84. As shown, each fastener tooth 68 tapers inwardly from the fastener body 66 to its respective distal tooth end 84. The gutter mesh fasteners 64 are each respectively secured to the roof 54 with a single mechanical fastener 86, here in the form of a roofing bolt.

The gutter 58 incudes first and second opposing, laterally spaced apart co-extensive gutter walls 88, 90 which define the gutter channel 60. The first gutter wall 88 is located proximate the edge 52 of the roof 54 and the second gutter wall 90 being laterally spaced apart from the edge 52 of the roof 54. The second gutter wall 90 of the gutter 58 is secured to the wall 55, here a parapet wall, of the building 56.

The gutter installation 50 includes a support formation 92 operatively adapted to secure a portion of the gutter mesh 62 proximate the second gutter wall 90 of the gutter 58. In this embodiment the support formation 92 includes an elongate support member 94 secured to the wall 55. The support member 94 is an angle iron which is mounted to the wall 55 with a plurality of mechanical fasteners, here bolts 95. The support formation 92 includes an elongate support mesh fastener 96 operatively adapted to secure the gutter mesh 62 to the support member 94.

The support mesh fastener 96 includes a support spine 98 adapted to be secured to the support member 94. The support mesh fastener 96 further includes a plurality of serrated support teeth 100 outwardly extending from the support spine 98. The support teeth 100 are arranged in two opposing teeth rows 101, 103 which are located on opposite sides of the support spine 98. The support teeth 100 are operatively adapted to grip the gutter mesh 70 or to pass through at least some of the openings 70 of the gutter mesh 62 to secure the gutter mesh 62 to the support member 94. The support spine 98 is secured to the support member 94 with mechanical fasteners 102, provided in the form of bolts.

The gutter mesh fastener 64 is produced by providing a non-illustrated strip of metal whereafter the shape of the fastener teeth 68 is punched from the strip of metal and the fastener teeth 68 are bent into an appropriate form.

FIGS. 13 and 14 show a second and third embodiment gutter mesh fastener 104, 106. The gutter mesh fasteners 104, 106 operate in a manner similar to the gutter mesh fastener 64 with the difference that the gutter mesh fastener 104 includes 6 fastener teeth 68 while the gutter mesh fastener 106 includes 12 fastener teeth 68. It will be appreciated that the gutter mesh fasteners 104, 106 can have any number of fastener teeth 68 and are not limited to 6 or 12 fastener teeth and also need not be evenly spaced apart. The fastener body 66 of each gutter mesh fastener 104, 106 includes a fastener hole 108 through which a mechanical fastener can pass. It will be appreciated that the fastener bodies 66 need not include fastener holes 108 and that the holes can be created during installation when a fastener is forced to pass through a fastener body 66.

FIGS. 15, 16 and 17 show fourth, fifth and sixth embodiment gutter mesh fasteners 110, 112, 114 which are produced by providing a strip of non-illustrated metal whereafter the shape of the fastener teeth 68 is punched out from the strip of metal and bent into the desired form.

Figure 18:
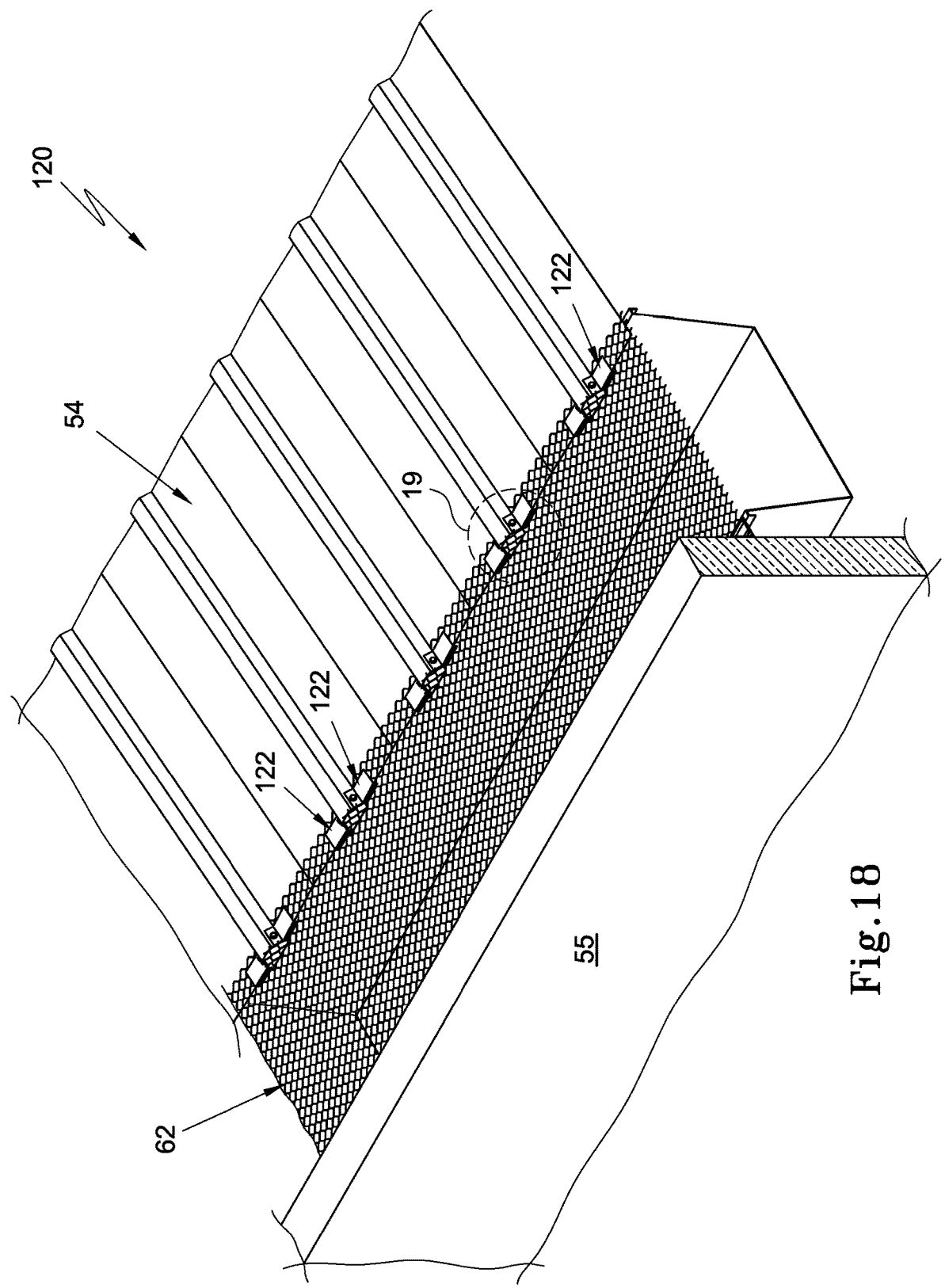
FIG. 18 is a perspective view of a portion of a second embodiment gutter installation.
Figure 19:
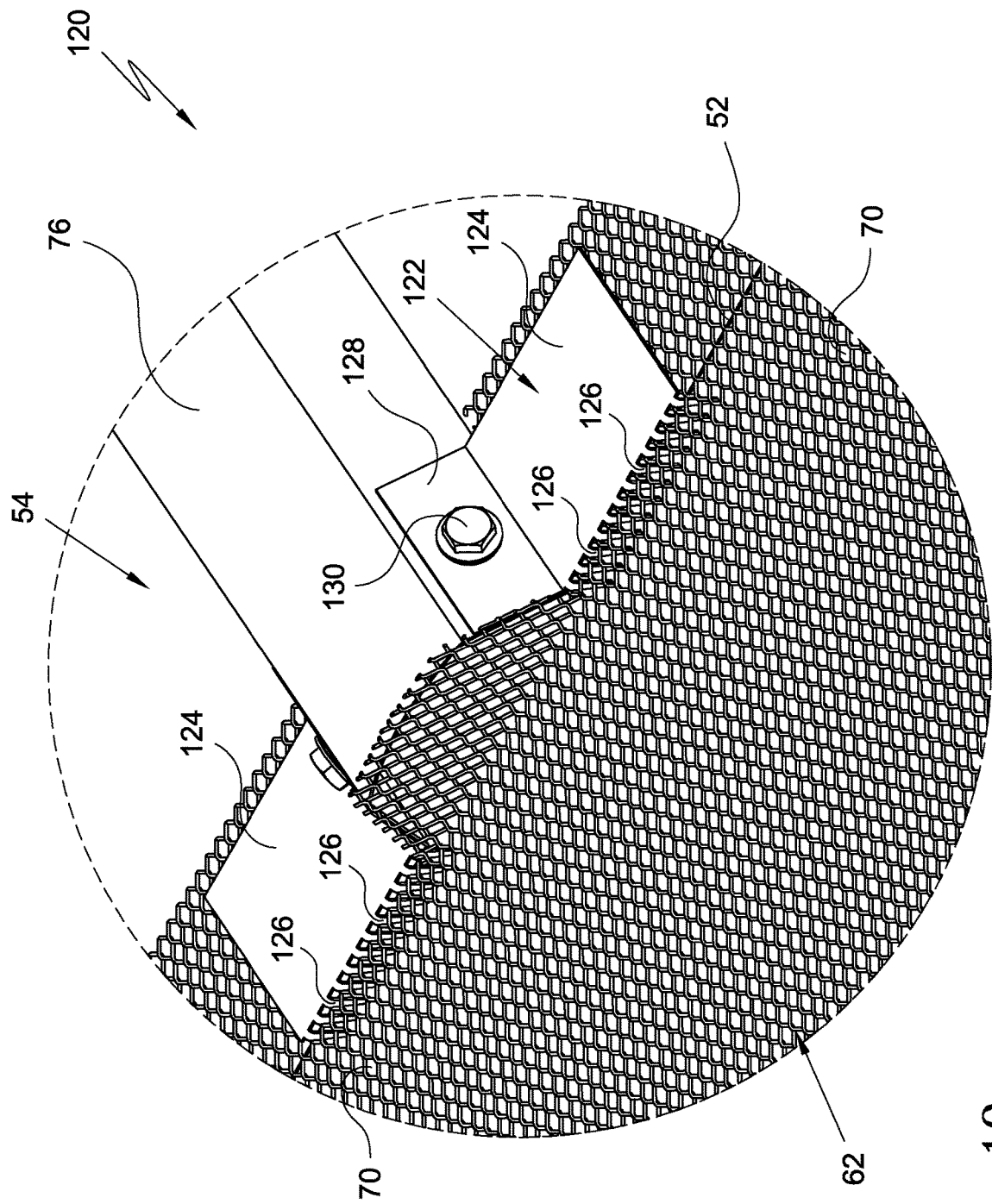
FIG. 19 is an enlarged view of portion 19 marked in FIG. 18 showing a seventh embodiment gutter mesh fastener.

FIGS. 18 and 19 show a second embodiment gutter installation 120. This embodiment differs from the gutter installation 50 in that an alternative gutter mesh fastener 122 is provided. The gutter mesh fastener 122 includes a fastener body 124 operatively adapted to be mounted to a top surface of the roof 54 and secured at the edge of the roof 54. The gutter mesh fastener 122 further includes a plurality of fastener teeth 126 outwardly extending from the fastener body 124. The fastener teeth 126 are operatively adapted to pass through mesh openings 70 of the gutter mesh 62 to secure the gutter mesh 62 to the roof 54. The gutter mesh fastener 122 includes a ridge fastener body 128 secured to the fastener body 124 and angled relative to the fastener body 124. The gutter mesh fastener 122 is secured to a ridge 76 of the roof 54 with a mechanical fastener 130 which passes through the ridge fastener body 128. The gutter mesh fastener 122 is formed by pressing the fastener teeth 126 in the manner described above. It is pointed out that the gutter mesh fastener 122 has a left-hand and right-hand embodiment located on opposite sides of the ridge 76.

Figures 20, 21:
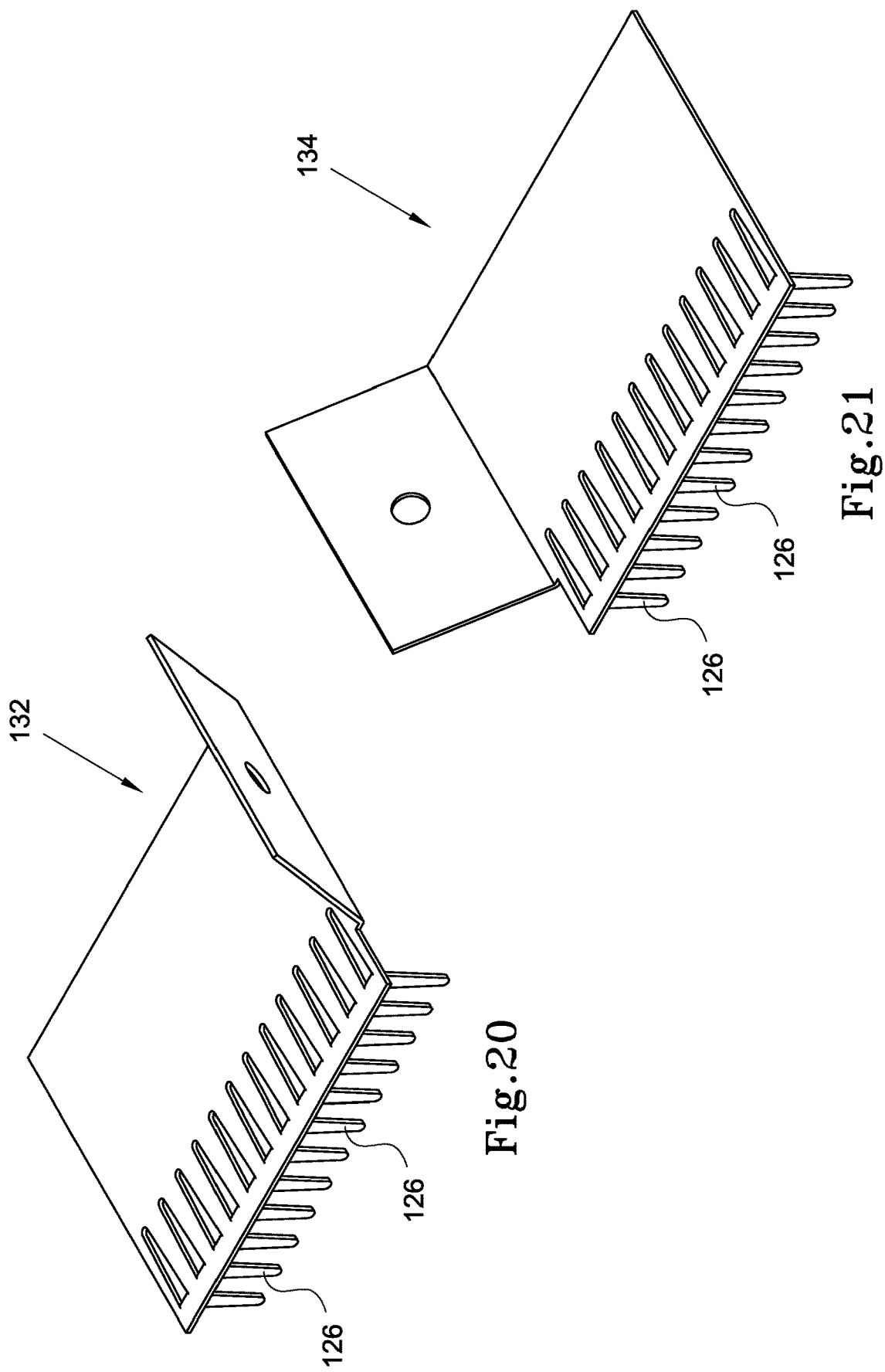
FIG. 20 is a perspective view of an eighth embodiment gutter mesh fastener.
FIG. 21 is a perspective view of a ninth embodiment gutter mesh fastener.

FIGS. 20 and 21 show eighth and ninth embodiment gutter mesh fasteners 132, 134 similar to the gutter mesh fastener 122. The gutter mesh fasteners 132, 134 are left-hand and right-hand versions operatively adapted for location on opposite sides of a ridge of roof. In this embodiment the fastener teeth 126 are punched from a non-illustrated strip of metal whereafter the fastener teeth 126 are bent into the appropriate form.

FIGS. 22, 23 and 24 show tenth, eleventh and twelve embodiment gutter mesh fasteners 140, 142, 144 which operate in the manner of the above described gutter mesh fasteners. The gutter mesh fasteners 140, 142, 144 include fastener teeth 146 which extend outwardly from their fastener bodies 148 toward a distal tooth end 150. The fastener teeth 146 of the gutter mesh fasteners 140, 142, 144 each have arrowhead shaped distal tooth ends 150.

Figure 25:
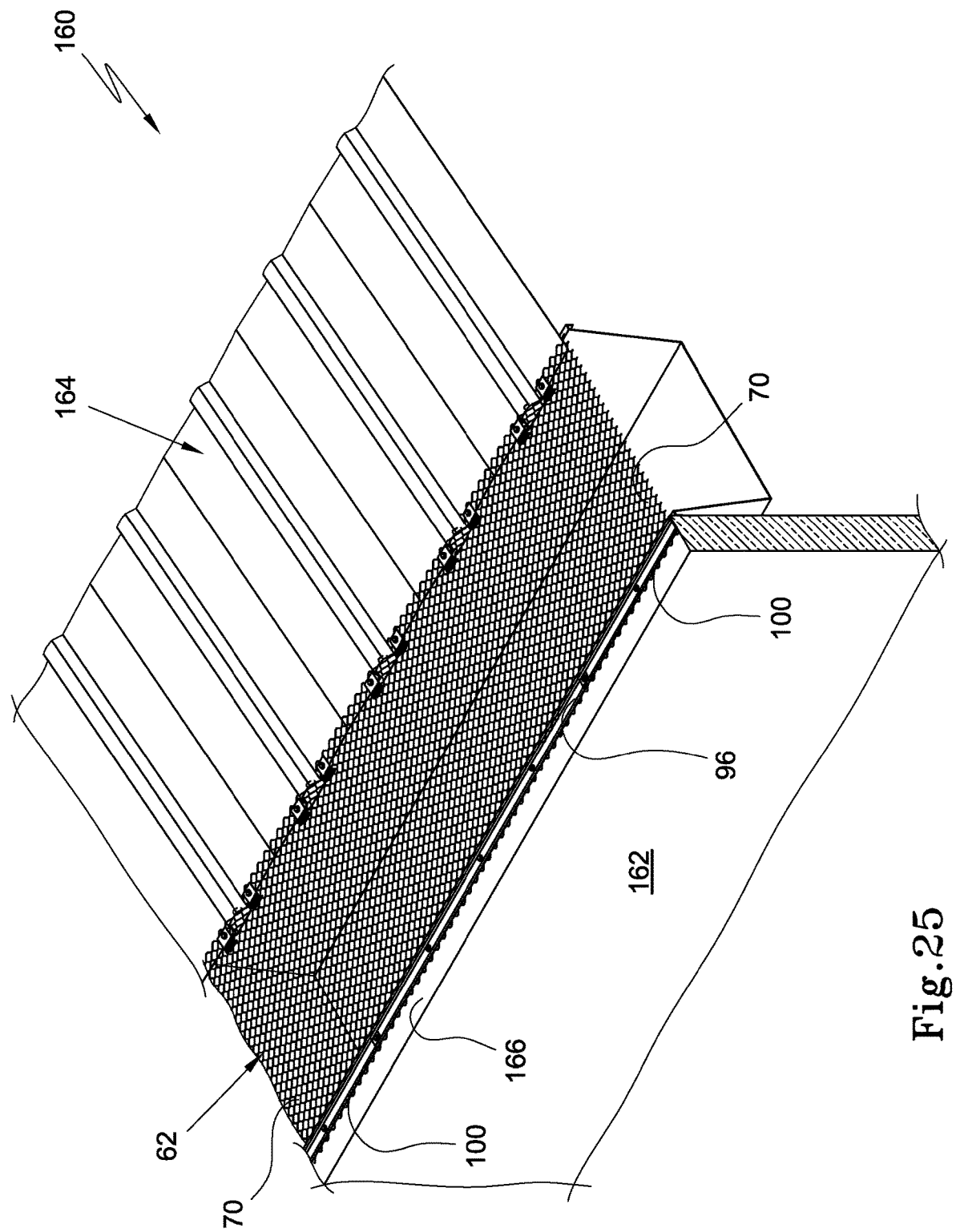
FIG. 25 is a perspective view of a third embodiment gutter installation.

FIG. 25 shows a third embodiment gutter installation 160. In the gutter installation 160 a wall 162 is provided which is lower in height relative to a roof 164 of a building than is the case with the first embodiment gutter installation 50 of FIG. 1. It is, therefore, not necessary in the gutter installation 160 to provide a support member 94 as the support mesh fastener 96 can be secured directly on a top flat surface 166 of the wall 162. As is the case with the first embodiment gutter installation 160, serrated support teeth 100 of the support mesh fastener 96 are operatively adapted to pass through mesh openings 70 of the gutter mesh 62 to secure the gutter mesh 62 to wall 162.

The description above has focused on box-gutter type installations. It would of course be readily appreciated that the disclosed gutter installations may also be employed for external or eaves gutters. Such a fourth embodiment gutter installation is illustrated in FIG. 26 and indicated with the reference numeral 170. In the gutter installation 170 gutter mesh 62 is employed to cover an eaves gutter 172. The gutter mesh 62 is secured to a roof 174 of a building with the use of gutter mesh fasteners 64 in the manner described previously. At an opposite end the gutter mesh 64 is secured to the eaves gutter 172 with screws 176. To provide a neat finish a trim 178 is secured to an outside of the eaves gutter 172 with the use of the screws 176.

It is pointed out that the fastener teeth 68 of gutter mesh fastener 64 could be folded over and crushed with an item of hardware such as pliers to hold the mesh for alternative applications. In effect the fastener teeth 68 can be angled between 0° and 180° depending on the configuration of the structure where the gutter mesh fastener 64 is to be employed.

Although the invention has been described with reference to specific examples, it will be appreciated by those skilled in the art that the invention may be embodied in many other forms.

KEY

50 Gutter installation
52 Edge

54 Roof
55 Wall
56 Building
58 Gutter
60 Gutter channel
62 Gutter mesh
64 Gutter mesh fastener
66 Fastener body
68 Fastener teeth
70 Mesh openings
72 Planar surface
74 Upper surface
76 Ridge
78 Flat section
80 Upwardly bent portion
82 Opening
84 Distal tooth end
86 Mechanical fastener
88 First gutter wall
90 Second gutter wall
92 Support formation
94 Support member
95 Mechanical fastener
96 Support mesh fastener
98 Support spine
100 Support teeth
101 Row of support teeth
103 Row of support teeth
102 Mechanical fastener
104 Second embodiment gutter mesh fastener
106 Third embodiment gutter mesh fastener
108 Fastener hole
110 Fourth embodiment gutter mesh fastener
112 Fifth embodiment gutter mesh fastener
114 Sixth embodiment gutter mesh fastener
120 Second embodiment gutter installation
122 Seventh embodiment gutter mesh fastener
124 Fastener body
126 Fastener teeth
128 Ridge fastener body
130 Mechanical fastener
132 Eighth embodiment gutter mesh fastener
134 Ninth embodiment gutter mesh fastener
140 Tenth embodiment gutter mesh fastener
142 Eleventh embodiment gutter mesh fastener
144 Twelfth embodiment gutter mesh fastener
146 Fastener teeth
148 Fastener body
150 Distal tooth end
160 Third embodiment gutter installation
162 Wall
164 Roof
166 Top flat surface
170 Fourth embodiment gutter installation
172 Eaves gutter
174 Roof
176 Screws
178 Trim

The invention claimed is:

1. A gutter installation secured at an edge of a roof of a building including:
a gutter having a gutter channel to receive water flowing from the roof;
gutter mesh to cover at least a portion of the gutter channel; and
a gutter mesh fastener operatively adapted to secure the gutter mesh to the edge of the roof, the gutter mesh fastener including (i) a fastener body mounted to a top surface of the roof and secured at the edge of the roof, and (ii) a plurality of fastener teeth outwardly extending from the fastener body, the fastener teeth operatively adapted to pass through mesh openings of the gutter mesh to secure the gutter mesh to the roof.

2. The gutter installation according to claim 1, wherein the fastener body incudes a planar surface operatively adapted to abut an upper surface of the roof.

3. The gutter installation according to claim 2, wherein the fastener teeth are laterally spaced apart along the fastener body.

4. The gutter installation according to claim 3, wherein each fastener tooth extends longitudinally outwardly from the fastener body to a distal tooth end.

5. The gutter installation according to claim 4, wherein each fastener tooth tapers inwardly from the fastener body to the distal tooth end.

6. The gutter installation according to claim 5, wherein the gutter mesh fastener includes a ridge fastener body secured to the fastener body and angled relative to the fastener body.

7. The gutter installation according to claim 6, wherein the gutter mesh fastener is secured to the roof with a mechanical fastener.

8. The gutter installation according to claim 5, wherein each fastener tooth has an arrowhead shape at the distal tooth end.

9. The gutter installation according to claim 7, wherein the gutter incudes first and second opposing, laterally spaced apart co-extensive gutter walls, the gutter walls defining the gutter channel, wherein the first wall is located proximate the edge of the roof and the second wall is laterally spaced apart from the edge of the roof.

10. The gutter installation according to claim 9, wherein the second wall of the gutter is secured to a wall of the building.

11. The gutter installation according to claim 10, wherein the wall is a parapet wall.

12. The gutter installation according to claim 9, wherein the gutter installation includes a support formation operatively adapted to secure a portion of the gutter mesh proximate the second wall of the gutter.

13. The gutter installation according to claim 12, wherein the support formation includes an elongate support member secured to the wall.

14. The gutter installation according to claim 12, wherein the support formation includes an elongate support mesh fastener operatively adapted to secure the gutter mesh to the support member.

15. The gutter installation according to claim 14, wherein the support mesh fastener includes (i) a support spine adapted to be secured to the support member, and (ii) a plurality of support teeth outwardly extending from the support spine, the support teeth operatively adapted to pass through mesh openings of the gutter mesh to secure the gutter mesh to the support member.

16. The gutter installation according to claim 15, wherein the support spine is secured to the support member.

17. The gutter installation according to claim 16, wherein the support spine is secured to the support member with a mechanical fastener.

18. The gutter installation according to claim 1, including a support mesh fastener, the support mesh fastener having (i) a support spine operatively associated with the gutter mesh to be secured in position, and (ii) a plurality of support teeth outwardly extending from the support spine, the support teeth operatively adapted to grip the gutter mesh to secure the gutter mesh in position, wherein the support teeth are arranged in two opposing rows located on opposite sides of the support spine.

19. The gutter installation according to claim 1, including a support mesh fastener, the support mesh fastener having (i) a support spine operatively associated with the gutter mesh to be secured in position, and (ii) a plurality of support teeth outwardly extending from the support spine, the support teeth operatively adapted to grip the gutter mesh to secure the gutter mesh in position.

* * * * *